(12) United States Patent
Wamura (10) Patent No.: US 10,707,794 B2
(45) Date of Patent: Jul. 7, 2020

(54) MOTOR DRIVE CONTROL DEVICE FOR A MULTICOPTER

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Tetsuro Wamura, Fujisawa Kanagawa (JP)

(73) Assignees: KABUSHIKI KAISHA TOSHIBA, Tokyo (JP); TOSHIBA ELECTRONICS DEVICES & STORAGE CORPORATION, Tokyo (JP)

( * ) Notice: Subject to any disclaimer, the term of this patent is extended or adjusted under 35 U.S.C. 154(b) by 314 days.

(21) Appl. No.: 15/908,822

(22) Filed: Mar. 1, 2018

(65) Prior Publication Data
US 2019/0081584 A1  Mar. 14, 2019

(30) Foreign Application Priority Data

Sep. 14, 2017  (JP) ................. 2017-177112

(51) Int. Cl.
*H02P 21/22* (2016.01)
*H02P 21/18* (2016.01)
(Continued)

(52) U.S. Cl.
CPC ............ *H02P 21/22* (2016.02); *B64C 39/024* (2013.01); *H02P 5/74* (2013.01); *H02P 6/18* (2013.01);
(Continued)

(58) Field of Classification Search
CPC ........... H02P 21/22; H02P 21/18; B64C 39/02
See application file for complete search history.

(56) References Cited

U.S. PATENT DOCUMENTS 6,541,937 B2 *  4/2003  Kato ....................... H02P 21/09
                                                          318/632
2016/0200421 A1 *  7/2016  Morrison ............ G05D 1/0077
                                                          244/17.23
(Continued)

FOREIGN PATENT DOCUMENTS

JP           6051327 B1   12/2016
JP      2017-506784 A     3/2017
(Continued)

*Primary Examiner* — Kira Nguyen
(74) *Attorney, Agent, or Firm* — Kim & Stewart LLP (57) ABSTRACT

A multicopter includes a body, propellers, each of which is rotated by a motor to generate lift for the body, a main controller configured to supply a speed instruction signal to the motor, a supply circuit configured to supply a torque current signal and a field current signal obtained from the motor, and a motor drive control device. The motor drive control device includes a control signal generation circuit configured to generate a torque current instruction signal and a field current instruction signal in response to the speed instruction signal, a vector control circuit configured to receive the torque current signal, the field current signal, the torque current instruction signal and the field current instruction signal, and output control signals so that the torque current signal and the field current signal from the motor coincide with the torque current instruction signal and the field current instruction signal, respectively, and a motor driver circuit configured to accept the control signals from the vector control circuit to control the motor.

20 Claims, 4 Drawing Sheets

(51) Int. Cl.
   *B64C 39/02*     (2006.01)
   *H02P 5/74*      (2006.01)
   *H02P 6/18*      (2016.01)

(52) U.S. Cl.
   CPC ........ *H02P 21/18* (2016.02); *B64C 2201/024* (2013.01); *B64C 2201/027* (2013.01); *B64C 2201/108* (2013.01)

(56) References Cited

U.S. PATENT DOCUMENTS

| | | | |
|---|---|---|---|
| 2017/0225795 A1 | 8/2017 | Lin et al. | |
| 2018/0181099 A1* | 6/2018 | Steinbach | H02P 25/08 |
| 2018/0191284 A1* | 7/2018 | Wu | H02P 21/28 |
| 2018/0233987 A1* | 8/2018 | Steinbach | H02K 3/04 |

FOREIGN PATENT DOCUMENTS

| | | |
|---|---|---|
| JP | 2017-074868 A | 4/2017 |
| WO | 2017/203552 A1 | 11/2017 |

\* cited by examiner

MOTOR DRIVE CONTROL DEVICE FOR A MULTICOPTER

CROSS-REFERENCE TO RELATED APPLICATION

This application is based upon and claims the benefit of priority from Japanese Patent Application No. 2017-177112, filed Sep. 14, 2017, the entire contents of which are incorporated herein by reference.

FIELD

Embodiments described herein relate generally to a motor drive control device.

BACKGROUND

A technique has been developed to connect a main controller and an electric speed controller (ESC) via a bidirectional communication transmission path and to control a motor that drives rotors of a multicopter.

In the multicopter, the flight speed and the flight attitude are determined by propulsion generated by rotation of rotors driven by the motor. The motor load fluctuates depending on the flight environment, which frequently changes from influences such as wind. Thus, it is desirable that information indicating the operation state of the motor is appropriately supplied to the main controller and that the appropriate control command is supplied to the ESC from the main controller based on the information indicating the operation state of the motor.

DETAILED DESCRIPTION

An embodiment provides a motor drive control device having high efficiency in which an operation state of a motor is appropriately supplied to a main controller and a control command based on the operation state of the motor is appropriately supplied from the main controller to an ESC.

In general, according to one embodiment, a multicopter includes a body, propellers, each of which is rotated by a motor to generate lift for the body, a main controller configured to supply a speed instruction signal to the motor, a supply circuit configured to supply a torque current signal and a field current signal obtained from the motor, and a motor drive control device. The motor drive control device includes a control signal generation circuit configured to generate a torque current instruction signal and a field current instruction signal in response to the speed instruction signal, a vector control circuit configured to receive the torque current signal, the field current signal, the torque current instruction signal and the field current instruction signal, and output control signals so that the torque current signal and the field current signal from the motor coincide with the torque current instruction signal and the field current instruction signal, respectively, and a motor driver circuit configured to accept the control signals from the vector control circuit to control the motor.

Hereinafter, a motor drive control device according to embodiments will be described with reference to the drawings. Incidentally, the present disclosure is not limited by the embodiments.

First Embodiment

Figure 1:
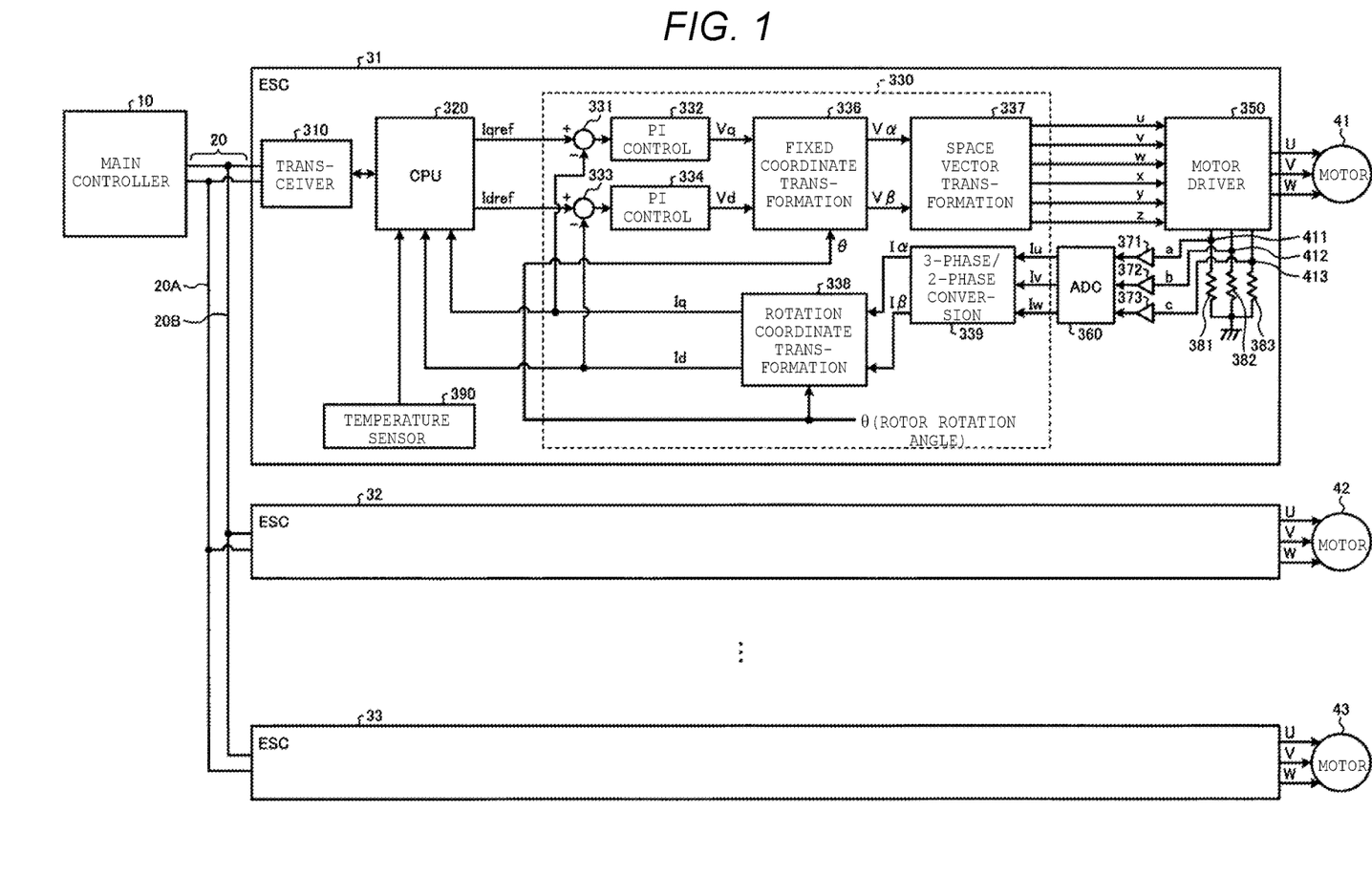
FIG. 1 is a view illustrating a configuration of a motor drive control device according to a first embodiment.

FIG. 1 is a view illustrating a configuration of a motor drive control device of a first embodiment. The motor drive control device of this embodiment includes a main controller 10. The main controller 10 includes, for example, a central processing unit (CPU). The main controller 10 generates a speed instruction signal for drive control systems that designate rotational speeds of motors 41 to 43. The speed instruction signal is a digital signal of CAN (Controller Area Network) specification (hereinafter, referred to as a CAN signal). The speed instruction signal is supplied to electric speed controllers (ESCs) 31 to 33 via a CAN communication transmission path 20 including bus signal lines 20A and 20B. In the motor drive control device, the motor is controlled using bidirectional communication and vector control. The vector control is a method of decomposing a current value of the motor into a torque component (q-axis) and a magnetic field component (d-axis) and optimally controlling it according to a position of a rotor, thereby always detecting the position of the rotor. The bidirectional communication and the vector control will be described in detail.

The speed instruction signal of the CAN specification is configured according to a digital signal with which logic levels "0" and "1" are correlated by a differential voltage between two bus signal lines 20A and 20B. The digital signal of the CAN specification is correlated with the differential voltage, and thus is called differential data.

The main controller 10 includes a transceiver (not illustrated) that converts a pulse width modulation (PWM) signal, having a pulse width controlled corresponding to the rotational speed, into the digital signal of the CAN specification.

For example, the main controller 10 adds addresses corresponding to the ESCs 31 to 33 to the speed instruction signals to be sent as an identification signal, and sends the speed instruction signals. Each of the ESCs 31 to 33 is specified by detecting a corresponding identification signal.

A configuration of the ESC will be described below using the ESC 31 as an example. The ESC 31 includes a transceiver 310. The transceiver 310 performs a predetermined process on the CAN signal supplied from the main controller 10 via the CAN communication transmission path 20 and supplies the CAN signal to a central processing unit (CPU) 320.

For example, the transceiver 310 converts the CAN signal into a format that can be processed by the CPU 320 and supplies the converted CAN signal to the CPU 320. Conversely, the transceiver 310 converts the signal supplied from the CPU 320 into a CAN signal and sends the CAN signal to the CAN communication transmission path 20.

The CPU 320 converts the speed instruction signal of the motor from the main controller 10 into a torque current instruction signal Iqref and a field current instruction signal Idref and outputs the converted signals. The torque current instruction signal Iqref and the field current instruction signal Idref are supplied to a vector control circuit 330.

The vector control circuit 330 can also be configured with software or can also be configured via hardware logic. In FIG. 1, the description will be given as a functional block including both cases. The description will be given based on the configuration illustrated in FIG. 1.

The torque current instruction signal Iqref is added to a torque current signal Iq sent from the motor (331), and a signal Vq is output by PI control 332 so that both signals coincide with each other. The PI control 332 reduces the current when the torque current signal Iq is larger than the torque current instruction signal Iqref, and increases the current when the torque current signal Iq is smaller than the torque current instruction signal Iqref. Here, the PI control refers to P (proportional) and I (integral) control.

The field current instruction signal Idref is added to a field current signal Id sent from the motor (333), and a signal Vd is output by PI control 334 so that both signals coincide with each other. The PI control 334 reduces the current when the field current signal Id is larger than the field current instruction signal Idref, and increases the current when the field current signal Id is smaller than the field current instruction signal Idref.

The signals Vq and Vd are two-phase voltage values. This is because the input signal to a motor driver 350, which is a final output of the vector control, is a voltage value.

Using the signals Vq and Vd which are the voltage values, a fixed coordinate transformation 336 is performed to transform from a rotation coordinate to a fixed coordinate and outputs signals Vα and Vβ. An inverse Park transformation is used for the fixed coordinate transformation 336.

From the inverse Park transformation, the signals Vα and Vβ indicated by the following expressions (1) and (2) are obtained.

$$V\alpha = Vd \cdot \cos\theta - Vq \cdot \sin\theta \quad (1)$$

$$V\beta = Vd \cdot \sin\theta + Vq \cdot \cos\theta \quad (2)$$

Here, θ represents a rotation angle. The rotation angle θ is a rotation angle of a rotor (not illustrated) of the motor 41.

A space vector transformation 337 is performed using the two-phase signals Vα and Vβ, and three-phase drive signals u, v, w, x, y, and z are output. The drive signals x, y, and z are inversed-phase signals of the drive signals u, v, and w, respectively.

The drive signals u, v, w, x, y, and z are supplied to the motor driver 350.

On/Off of a driver transistor (not illustrated) constituting the motor driver 350 is controlled by the drive signal u, v, w, x, y, and z supplied to a gate of the driver transistor. The motor driver 350 operates in response to the drive signals u, v, w, x, y, and z and generate three-phase drive currents U, V, and W, and the generated drive currents are supplied to the motor 41. The motor 41 is a three-phase induction motor, and the three-phase drive currents U, V, and W are supplied to an excitation coil (not illustrated) of the motor 41.

The motor 41 rotates a rotating shaft (not illustrated) in response to the supplied drive currents. For example, a propeller (not illustrated) is provided on the rotating shaft of the motor 41. The rotation of the motor 41 causes the propeller to rotate, thereby generating a lifting force, for example, levitating a multicopter (not illustrated) mounted with the motor drive control device of the first embodiment. A configuration of the motor driver 350 will be described.

The drive currents U, V, and W of the motor driver 350 are detected. The detection is performed by detecting a current flowing from the motor driver 350 into shunt resistors 381 to 383.

Drive currents U, V, and W are detected as voltage drops at the shunt resistors 381 to 383. Voltages of connection terminals 411 to 413 of the shunt resistors 381 to 383 are output as monitor signals a to c, respectively. The monitor signals a to c are three-phase signals. The monitor signals a to c are amplified by amplifier circuits 371 to 373, and are supplied to A/D converter (ADC) 360.

The A/D converter 360 outputs three-phase digital current signals Iu, Iv, and Iw corresponding to the monitor signals a to c. The three-phase digital current signals Iu, Iv, and Iw are converted into the two-phase current values Iα and Iβ by three-phase/two-phase conversion 339. The three-phase/two-phase conversion 339 is performed by Clarke transformation to convert the three-phase digital current signals Iu, Iv, and Iw into the two-phase current values Iα and Iβ.

The Clarke transformation generates two-phase current values Iα and Iβ indicated by the following expressions (3) and (4).

$$I\alpha = Iu \quad (3)$$

$$I\beta = (Iu + 2 \cdot Iv)/\sqrt{3} \quad (4)$$

The two-phase current values Iα and Iβ are subjected to a rotation coordinate transformation 338, and the torque current signal Iq and the field current signal Id are output. That is, the torque current signal Iq and the field current signal Id can be obtained based on the drive currents U, V, and W of the motor driver 350 indicating the operation state of the motor 41. The rotation coordinate transformation 338 is performed by Park transformation.

The two-phase field current signal Id and the torque current signal Iq indicated by the following expressions (5) and (6) are obtained via the Park transformation.

$$Id = I\alpha \cdot \cos\theta + I\beta \cdot \sin\theta \quad (5)$$

$$Iq = -I\alpha \cdot \sin\theta + I\beta \cdot \cos\theta \quad (6)$$

As described above, the torque current signal Iq and the field current signal Id are supplied to the PI controls 332 and 334, which compares with the torque current instruction signal Iqref and the field current instruction signal Idref, and are supplied to the CPU 320.

The CPU 320 supplies information of the torque current signal Iq and the field current signal Id to the transceiver 310. The supplied information of the torque current signal Iq and the field current signal Id is information on the operation status of the motors 41 to 43. This information includes the value (torque current signal Iq and the field current signal Id) obtained by the expressions (5) and (6) described above and/or an position estimation error θe (to be described below) or information obtained from results of an arithmetic operation using these values as parameters.

The transceiver 310 converts the information of the torque current signal Iq and the field current signal Id into CAN data, and supplies the CAN data to the main controller 10 via the CAN communication transmission path 20.

In the first embodiment, the motor drive control device controls the operation state of the motors 41 to 43 with the vector control, and supplies position estimation error information indicating the operation state of the motors 41 to 43 to the main controller 10 via the CPU 320. The position estimation error information generated by detection of the current of the motor driver 350 indicates the operation state of the motors 41 to 43. Therefore, when the position estimation error information is supplied to the main controller 10, the main controller 10 can supply an instruction signal of the rotational speed to the ESCs 31 to 33 based on the operation state of the motors 41 to 43.

For example, the main controller 10 can be configured to determine that the motor is in a step-out state when the position estimation error signal exceeds a predetermined threshold value, and to supply a signal for stopping the driving of the motor to the ESC.

Bidirectional communication is performed between the main controller 10 and each of the ESCs 31 to 33 through the CAN communication transmission path 20.

The CAN data supplied via the CAN communication transmission path 20 is differential data. Therefore, for example, even when noise is superimposed on the voltage of the bus signal lines 20A and 20B, the noise is cancelled between the two bus signal lines 20A and 20B, and thus the data becomes a signal which is excellent in noise resistance. Accordingly, the position estimation error signal indicating the operation state of the motors 41 to 43 can be supplied to the main controller 10 with high accuracy. Thus the main controller 10 can supply an appropriate control signal to each of the ESCs 31 to 33 based on the operation state of the motors 41 to 43.

Further, each of the ESCs 31 to 33 includes a temperature sensor 390. For example, the temperature sensor 390 detects a temperature of a MOS transistor (not illustrated) constituting the motor driver 350 and supplies temperature information to the CPU 320.

For example, when the MOS transistor constituting the motor driver 350 is found overheated by the temperature information supplied from the temperature sensor 390, the current supplied to the MOS transistor is limited. Thus it is possible to avoid damage of the motor driver 350 due to overheating. The temperature information may be supplied to the CPU 320 together with the information of the torque current signal Iq and the field current signal Id described above according to time. Accordingly, it is possible to grasp the driving status of the motor more accurately, to transmit information on the operation status to the operation terminal (flight controller) operated by an operator, and to control the motor drive control device more appropriately.

In addition, the three-phase drive currents U, V, and W for driving the motors 41 to 43 forma sine wave by the vector control. The drive current of the sine wave can drive the motors 41 to 43 with low noise, high efficiency, and low power consumption, and thus it is possible to provide a motor drive control device with high efficiency.

Figure 2:
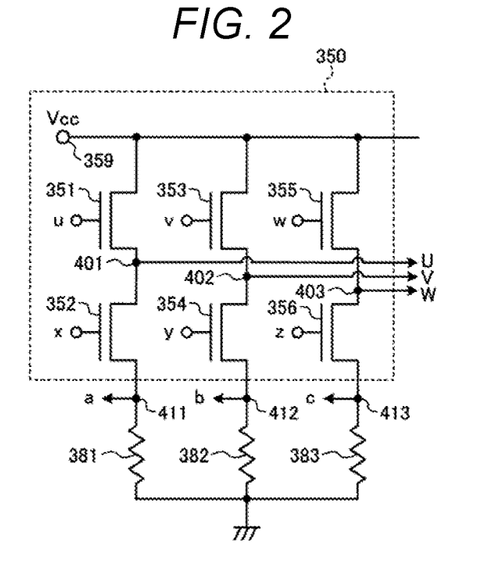
FIG. 2 is a diagram illustrating a configuration example of a motor driver.

FIG. 2 is a diagram illustrating a configuration example of the motor driver 350. The motor driver 350 includes Nch-MOS transistors 351, 353, and 355 whose drain is connected to the power supply terminal 359 to which a power supply voltage Vcc is supplied.

A source of the NchMOS transistor 351 and a drain of an NchMOS transistor 352 are connected to each other at a connection point 401. A signal "u" is applied to a gate of the NchMOS transistor 351, and an inverted-phase signal "x" of the signal "u" is applied to a gate of the NchMOS transistor 352. The connection point 401 is a U-phase output end.

A source of the NchMOS transistor 353 and a drain of an NchMOS transistor 354 are connected to each other at a connection point 402. A signal "v" is applied to a gate of the NchMOS transistor 353, and an inverted-phase signal "y" of the signal "v" is applied to a gate of the NchMOS transistor 354. The connection point 402 is a V-phase output end.

A source of the NchMOS transistor 355 and a drain of an NchMOS transistor 356 are connected to each other at a connection point 403. A signal "w" is applied to a gate of the NchMOS transistor 353, and an inverted-phase signal "z" of the signal "w" is applied to a gate of the NchMOS transistor 356. The connection point 403 is a W-phase output end.

A source of the NchMOS transistor 352 is grounded via the shunt resistor 381. A monitor signal "a" of the drive current of the motor driver 350 is supplied from a connection point 411 between the source of the NchMOS transistor 352 and the shunt resistor 381.

A source of the NchMOS transistor 354 is grounded via the shunt resistor 382. A monitor signal "b" of the drive current of the motor driver 350 is supplied from a connection point 412 between the source of the NchMOS transistor 354 and the shunt resistor 382.

A source of the NchMOS transistor 356 is grounded via the shunt resistor 383. A monitor signal "C" of the drive current of the motor driver 350 is supplied from a connection point 413 between the source of the NchMOS transistor 356 and the shunt resistor 383.

Figure 3:
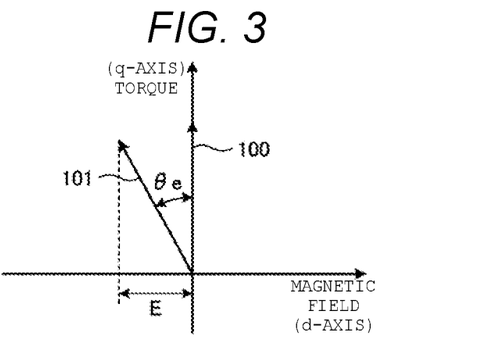
FIG. 3 is a diagram for explaining a position estimation error signal.

FIG. 3 is a vector diagram for explaining the position estimation error. A horizontal axis (also referred to as a d-axis) indicates a field current component calculated based on the monitor signals a, b, and c flowing through the shunt resistors 381 to 383 connected to the motor driver 350. The field current component corresponds to the field current signal Id output after the rotation coordinate transformation 338 in the motor drive control device of the first embodiment illustrated in FIG. 1. A vertical axis (also referred to as a q-axis) indicates a torque current component. Similarly, the torque current component corresponds to the torque current signal Iq output after the rotation coordinate transformation 338.

When the vector control is ideally performed, the position estimation error θe becomes zero "0" with respect to the torque current component (vertical axis). That is, the signal calculated based on the current value flowing through the shunt resistors 381 to 383 connected to the motor driver 350 is indicated as a vector 100 with the field current component being zero "0". In other words, the vector control controls the motor such that the position estimation error θe becomes zero "0".

However, in a state where the vector control is not normally performed, for example, when the load of the motor suddenly changes, an induced voltage E is generated in a field direction, so that the signal calculated based on the current value flowing through the shunt resistors 381 to 383 becomes a vector 101 because the position estimation error θe occurs between the calculated signal and a signal 100 in the ideal vector control. Therefore, the position estimation error θe is always provided from the ESCs 31 to 33 to the main controller 10, and thus the main controller 10 can grasp the driving state of the motor and appropriately control the motor.

However, when the position estimation error θe becomes larger than a predetermined value, there arises a situation in which the vector control can hardly follow, that is, a state in which the motor is stopped due to a step-out state. Accordingly, a configuration may be provided in which a predetermined threshold value is provided and a signal for notifying abnormality is supplied from the ESCs 31 to 33 to the main controller 10 when the position estimation error θe exceeds the threshold value. Alternatively, a configuration may be provided in which a signal for notifying abnormality that the threshold value has been exceeded is supplied to the main controller 10 together with the position estimation error θe.

The position estimation error θe and the signal for notifying the abnormality may be generated in the CPU 320 of the ESCs 31 to 33.

The position estimation error θe is obtained by an arithmetic operation from the information of the drive currents U, V, and W of the motor driver 350. That is, since the information can be obtained without using a sensor for detecting the rotational speed or rotational position, the cost of the motor drive control device can be reduced. In the first embodiment, the motor is controlled using a vector engine instead of software. For this reason, the arithmetic process can be simplified.

Second Embodiment

Figure 4:
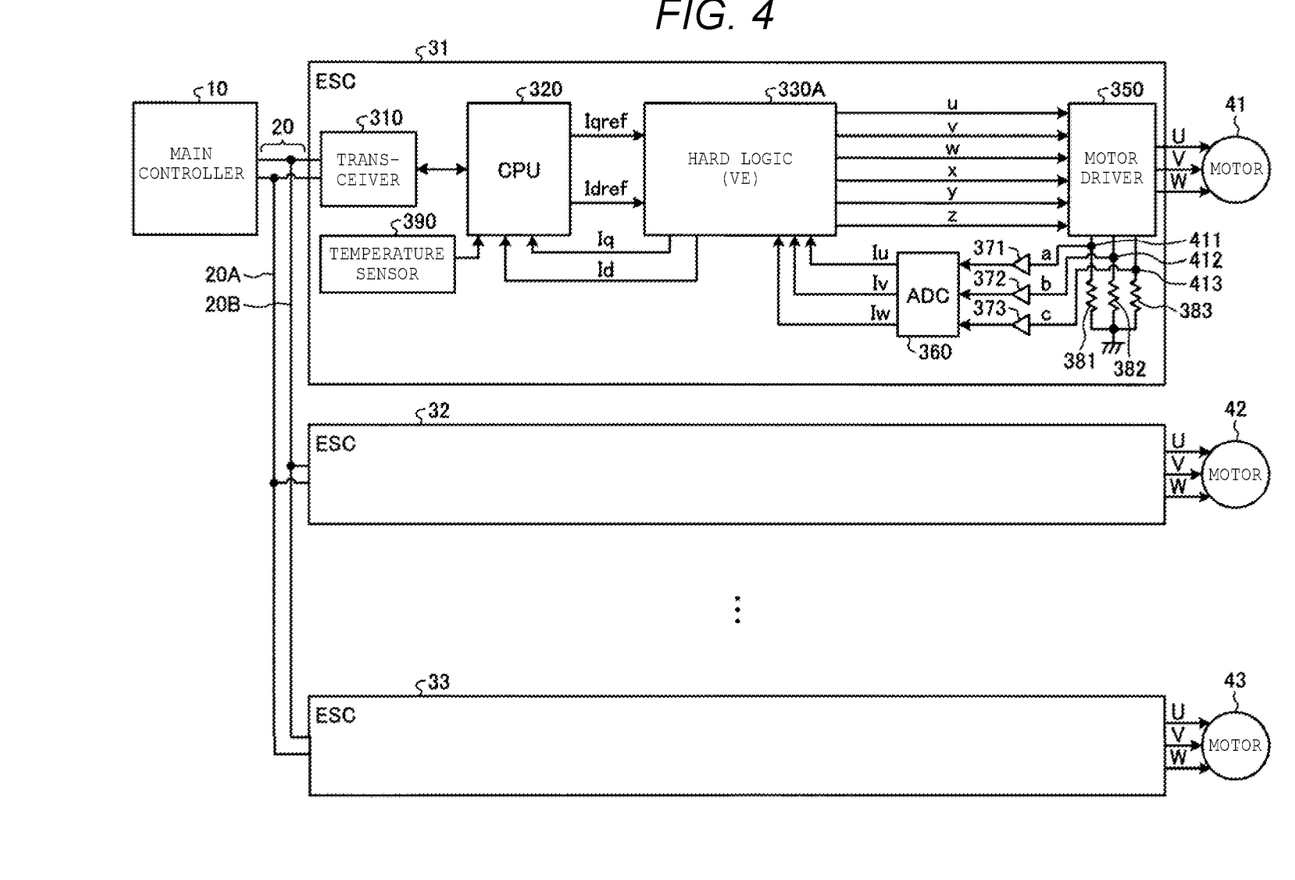
FIG. 4 is a view illustrating a configuration of a motor drive control device according to a second embodiment.

FIG. 4 is a diagram illustrating a configuration of a motor drive control device according to a second embodiment. The same reference numerals are given to configuration elements corresponding to those in the first embodiment described above, and repeated description will be made only as needed. In the second embodiment, the motor drive control device includes a hard logic unit 330A corresponding to the control circuit 330 of the motor drive control device according to the first embodiment illustrated in FIG. 1.

That is, the hard logic unit for executing a logic arithmetic process includes the PI controls 332 and 334, the fixed coordinate transformation 336, the space vector transformation 337, the rotation coordinate transformation 338, and the three-phase/two-phase conversion 339 of the motor drive control device according to the first embodiment illustrated in FIG. 1. The hard logic is sometimes called a wired logic.

As described above, various signal conversion processes including the vector control circuit 330 can be performed by, for example, software. For example, various processes including the vector control circuit 330 can be performed by the software in the CPU 320 illustrated in the motor drive control device according to the first embodiment in FIG. 1.

However, since the hard logic unit 330A performs some typical processes, for example, the PI controls 332 and 334, the fixed coordinate transformation 336, the space vector transformation 337, the rotation coordinate transformation 338, and the three-phase/two-phase conversion 339 of the motor drive control device according to the first embodiment illustrated in FIG. 1, separately from the process by software, the burden of CPU 320 can be reduced compared to the configuration in which all of the processes are performed by the CPU 320.

The processing capability of the CPU 320 whose burden is reduced can be assigned to another process. For example, it can be assigned to control when the load of the motors 41 to 43 suddenly change and control of the rotation number required to stably perform the vector control with respect to a broad range of change allowance of the rotation number of the motors 41 to 43.

In addition, there is also an effect that an arithmetic speed due to the hard logic is faster than an arithmetic speed due to the software.

Third Embodiment

Figure 5:
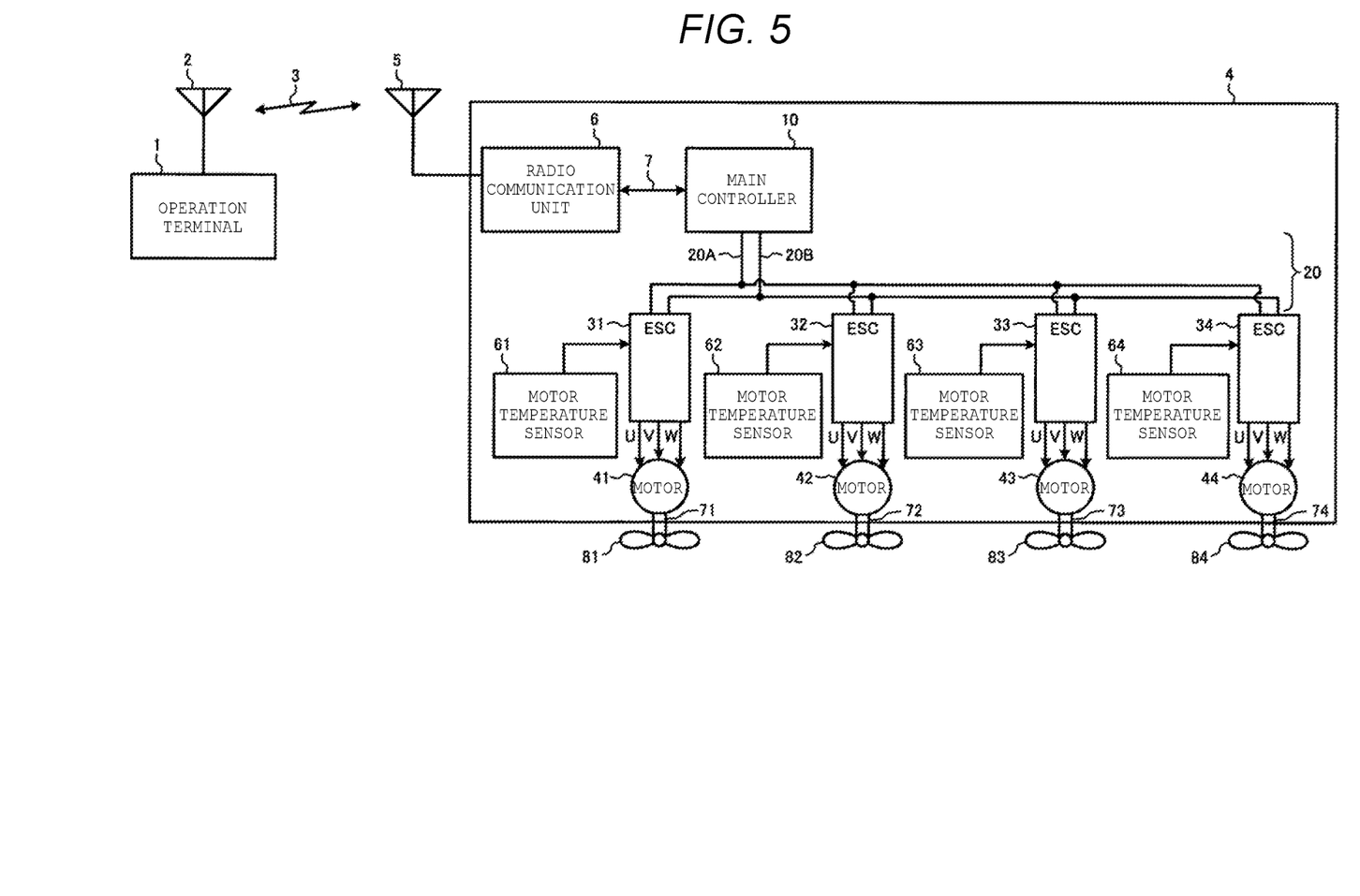
FIG. 5 is a view illustrating a configuration of a motor drive control device according to a third embodiment.

FIG. 5 is a diagram illustrating a configuration of a motor drive control device according to a third embodiment. The motor drive control device according to the third embodiment includes an operation terminal 1. The operation terminal 1 is operated by an operator. From the operation terminal 1, an operation signal is supplied to an antenna 5, which is provided in a moving object 4, as a radio signal 3 via an antenna 2.

The moving object 4 is, for example, an unmanned multicopter which is generally called a drone. Propellers 81 to 84 are driven by rotating shafts 71 to 74 which are rotated by the motors 41 to 44, respectively. A lifting force is generated by the rotation of the propellers 81 to 84, and the moving object 4 is levitated. The unmanned multicopter is mounted with three or more rotors. For example, a quadcopter has four mounted rotors, a hexacopter has six mounted rotors, and an octocopter has eight mounted rotors.

The radio signal 3 received by the antenna 5 is supplied to a radio communication unit 6. The radio communication unit 6 converts the radio signal 3 received by the antenna 5 into, for example, a control signal of a digital signal and supplies the signal to a main controller 10 via a signal line 7.

The main controller 10 supplies, for example, the signal indicating the operation state of the motors 41 to 44 through the signal line 7 to the radio communication unit 6. The radio communication unit 6 converts the signal sent from the main controller 10 into the radio signal 3 and transmits the radio signal via the antenna 5 to the antenna 2 of the operation terminal 1. Thereby, bidirectional communication is performed between the operation terminal 1 and the moving object 4.

The moving object 4 is mounted with, for example, the above-described motor drive control device of the first embodiment. That is, the moving object 4 includes the main controller 10 and ESCs 31 to 34 to which a CAN signal is supplied from the main controller 10.

Data are supplied to the ESCs 31 to 34 from motor temperature sensors 61 to 64, which measure the temperatures of the motors 41 to 44, respectively. For example, each of the ESCs 31 to 34 controls a drive signal supplied to the corresponding one of the motors 41 to 44 based on the data supplied from motor temperature sensors 61 to 64 to adjust the rotational speed of the motors 41 to 44. For example, by the control to stop supplying the drive current to the motor which is in an abnormal high-temperature state, a situation can be avoided in which the motor is damaged due to overheat.

The data from each of the motor temperature sensors 61 to 64 are supplied to the main controller 10 via each of the ESCs 31 to 34. With such a configuration, the main controller 10 can be configured to generate a speed instruction signal for controlling the rotational speed of the motors 41 to 44 by taking temperature information of the motors 41 to 44 into consideration. The data of each of the motor temperature sensors 61 to 64 may be constantly supplied to the main controller 10 at a predetermined timing, and may be supplied to the main controller 10 as an abnormal signal in a case where the temperature of the motor exceeds a predetermined threshold value.

According to the third embodiment, the control signal of the main controller 10 is supplied to the ESCs 31 to 34, which control the rotation number of the motors 41 to 44, via a CAN communication transmission path 20. By such a configuration that the control signal of the main controller 10 is converted into the CAN signal excellent in the noise resistance and is supplied to the ESCs 31 to 34, the control command of the main controller 10 can be accurately supplied to each of the ESCs 31 to 34.

Further, the main controller 10 converts the speed instruction signal into CAN data and supplies the data to each of the ESCs 31 to 34 via the CAN communication transmission path 20. A signal indicating the operation state of a motor is supplied to the main controller 10 from the each of the ESCs 31 to 34 via the CAN communication transmission path 20. That is, bidirectional communication is performed between the main controller 10 and each of the ESCs 31 to 34 via the CAN communication transmission path 20. For this reason, the main controller 10 can perform the control according to the operation state of each of the motors 41 to 44.

When the information on the operation state of each of the motors 41 to 44 is transmitted from the main controller 10 through a radio line including the radio communication unit 6 to the operation terminal 1, the operator can grasp the operation state of each of the motors 41 to 44. Thus, the operator can grasp the flight state of the moving object 4 to operate the operation terminal 1.

Incidentally, any configuration may be provided other than the configuration of the embodiment in which the propellers 81 to 84 are driven by each of the motors 41 to 44. For example, the moving object 4 may be a so called radio-controlled car or a two-wheeled vehicle in which wheels (not illustrated) are driven by the motors 41 to 44, or vehicles such as a ship and a robot which are driven by units other than the wheel. The speed instruction signal indicating the rotational speed supplied from the main controller 10 is supplied to each of the ESCs 31 to 34, and the rotational speed of each of the motors 41 to 44 is controlled, whereby traveling is controlled.

The main controller 10 and each of the ESCs 31 to 34 may be configured to communicate with each other through the transmission path based on telecommunications standard RS485 (Recommended Standard 485, and hereinafter, referred to as the RS485). The signal converted into differential data can also be transmitted and received in the RS485. The RS485 is a serial interface standard, and the data is transmitted by differential pair.

For example, the main controller 10 may include a transceiver that converts the PWM control signal instructing the rotational speed of the motor into a digital signal and converts the digital signal into a digital signal of the RS485 specification based on the RS 485.

The signal sent from the main controller 10 may be supplied to each of the ESCs 31 to 34 via the transmission path based on the RS485, and the supplied differential data may be converted by a transceiver (not illustrated) provided in each of the ESCs 31 to 34 and be supplied to the CPU 320 provided in each of the ESCs 31 to 34.

Similarly to the CAN signal, the data which is transmitted/received through the RS485 transmission path is differential data. For this reason, a control command sent from the main controller 10 can be supplied to the ESCs 31 to 34 in the state of being excellent in noise resistance. Accordingly, the rotational speed of the motors 41 to 44 can be accurately controlled by the main controller 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein maybe made without departing from the spirit of the inventions. The accompanying claims and their equivalents are intended to cover such forms or modifications as would fall within the scope and spirit of the inventions.

What is claimed is:

1. A multicopter comprising:
   a body;
   propellers, each of which is rotated by a motor to generate lift for the body;
   a main controller configured to supply a speed instruction signal to the motor;
   a supply circuit configured to supply a torque current signal and a field current signal obtained from the motor; and
   a motor drive control device including
      a control signal generation circuit configured to generate a torque current instruction signal and a field current instruction signal in response to the speed instruction signal;
      a vector control circuit configured to receive the torque current signal, the field current signal, the torque current instruction signal and the field current instruction signal, and output control signals so that the torque current signal and the field current signal from the motor coincide with the torque current instruction signal and the field current instruction signal, respectively; and
      a motor driver circuit configured to accept the control signals from the vector control circuit to control the motor.

2. The multicopter according to claim 1, wherein the speed instruction signal from the main controller is generated based on a CAN (Controller Area Network) specification and is supplied to the vector control circuit via a CAN communication transmission path.

3. The multicopter according to claim 1, wherein the vector control circuit performs vector control using hardware for executing a logic arithmetic process.

4. The multicopter according to claim 3, wherein the vector control circuit executes PI control, fixed coordinate transformation, space vector transformation, three-phase to two-phase conversion, and rotation coordinate transformation.

5. The multicopter according to claim 1, wherein the speed instruction signal is generated based on telecommunication standard RS485.

6. The multicopter according to claim 1, further comprising:
   a radio communication unit that supplies a control signal serving as an operation signal to the main controller through radio communication.

7. The multicopter according to claim 1, wherein the vector control circuit determines position estimation error from information of currents for driving the motor without use of a rotational sensor and supplies this information to the main controller.

8. The multicopter according to claim 7, wherein an abnormality is communicated to the main controller when the position estimation error exceeds a threshold value.

9. The multicopter according to claim 1, wherein the motor comprises three field coils and the vector control circuit supplies a torque current signal and a field current signal obtained from currents measured in the three field coils.

10. The multicopter according to claim 9, wherein the vector control circuit includes a three-phase to two-phase conversion of signals from the three field coils.

11. A method for controlling a multicopter motor, comprising:
   supplying a speed instruction signal from a main controller to a multicopter motor;
   generating a torque current instruction signal and a field current instruction signal in response to the speed instruction signal;

generating a torque current signal and field current signal from the motor; and outputting a control signal to the motor in response to the torque current instruction signal, the field current instruction signal, the generated torque current instruction signal and the generated field current signal such that the generated torque current and the field current signal from the motor coincide with the torque current instruction signal and the field current instruction signal, respectively.

12. The method according to claim 11, wherein the speed instruction signal from the main controller is generated based on a CAN (Controller Area Network) specification and is supplied to a vector control circuit via a CAN communication transmission path.

13. The method according to claim 12, wherein the vector control circuit uses hardware to execute a logic arithmetic process to generate the outputted control signal.

14. The method according to claim 13, wherein the vector control circuit executes PI control, fixed coordinate transformation, space vector transformation, three-phase to two-phase conversion, and rotation coordinate transformation.

15. The method according to claim 11, wherein the speed instruction signal is generated based on telecommunication standard RS485.

16. The method according to claim 11, further comprising:
sending a radio control signal from a radiocommunication unit to the main controller.

17. The method according to claim 11, further comprising:
determining rotor position estimation error without the use of a rotational sensor.

18. The method according to claim 17, wherein the step of communicating a rotor position abnormality to the main controller further comprises communicating when the rotor position estimation error exceeds a threshold value.

19. The method according to claim 11, wherein the step of generating a torque current signal and field current signal from the motor is carried out by measuring currents from three field coils of the motor.

20. The method according to claim 19, wherein the step of generating a torque current signal and field current signal from the motor further comprises conversion of three phase signals from the three field coils to two phase signals.

* * * * *